W. H. PICKLE.
EQUALIZER.
APPLICATION FILED FEB. 1, 1909.
926,019.
Patented June 22, 1909.
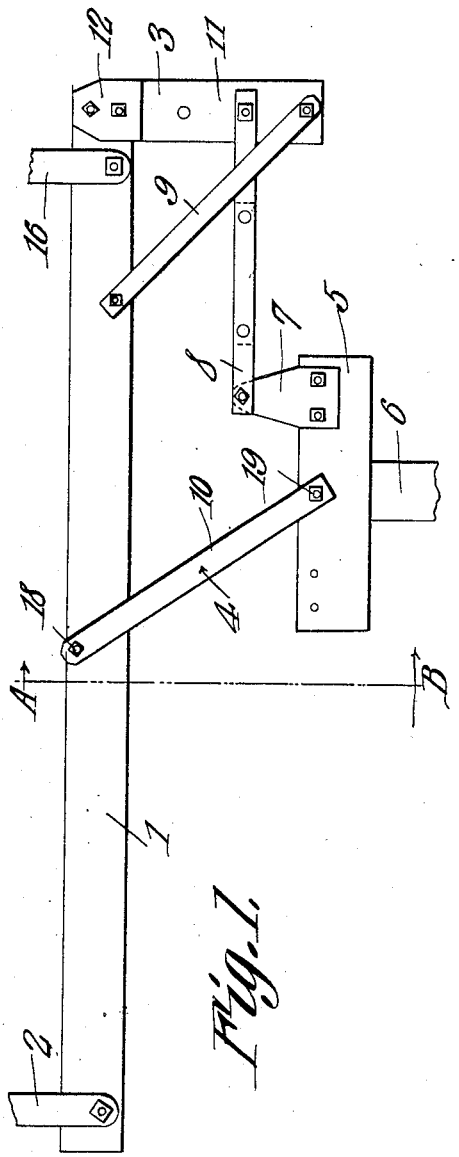
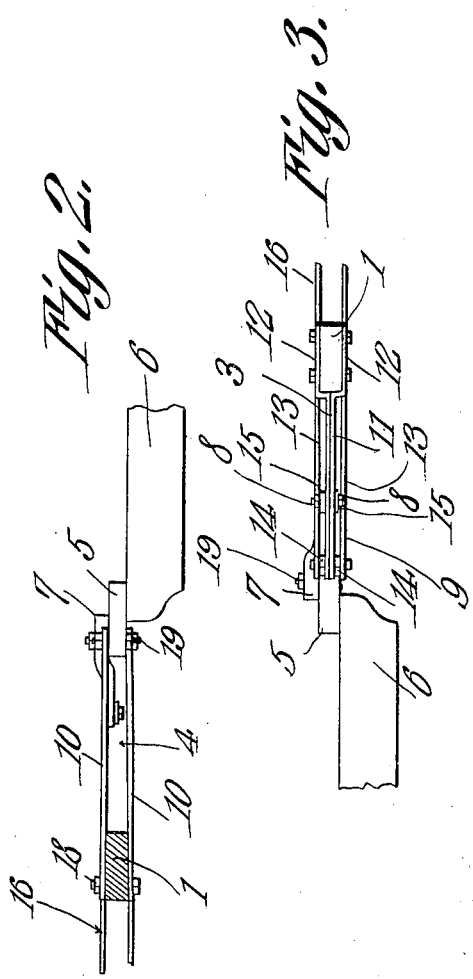
Witnesses
E. T. Stewart
Mason B. Lawton
Inventor
Walter H. Pickle.
By C. A. Snow & Co.
Attorneys

UNITED STATES PATENT OFFICE.

WALTER H. PICKLE, OF SPRAGUE, WASHINGTON, ASSIGNOR OF ONE-HALF TO JOHN I. MELVILLE, OF SPRAGUE, WASHINGTON.

EQUALIZER.

No. 926,019.  Specification of Letters Patent.  Patented June 22, 1909.

Application filed February 1, 1909. Serial No. 475,413.

*To all whom it may concern:*

Be it known that I, WALTER H. PICKLE, a citizen of the United States, residing at Sprague, in the county of Lincoln and State of Washington, have invented a new and useful Equalizer, of which the following is a specification.

The objects of the invention are, generally, the provision, in a merchantable form, of a device of the above mentioned class which shall be inexpensive to manufacture, facile in operation, and devoid of complicated parts; specifically, the provision of an equalizer adapted to be assembled with a plow in such manner that the plow may be disposed relatively near to one end of the equalizer, the plow being so assembled with the equalizer that a swinging movement in the plow will tend to offset the mechanical advantage given to certain of the draft animals by disposing the plow relatively near to one end of the equalizer; other and further objects being made manifest hereinafter as the description of the invention progresses.

The invention consists in the novel construction and arrangement of parts, hereinafter described, delineated in the accompanying drawings, and particularly pointed out in that portion of this instrument wherein in patentable novelty is claimed for certain distinctive and peculiar features of the device, it being understood that, within the scope of what hereinafter is thus claimed, divers changes in the form, proportion, size and minor details of the structure may be made without departing from the spirit or sacrificing any of the advantages of the invention.

Similar numerals of reference are employed to denote corresponding parts throughout the several figures of the drawings.

In the accompanying drawings:—Figure 1 shows my invention in top plan; Fig. 2 is a transverse section on the line A—B of Fig. 1; Fig. 3 is an end elevation of the device.

The improved equalizer herein described is adapted to be used upon hill-sides and elsewhere where it is desired that the largest possible number of the draft animals shall have a firm footing upon unbroken ground, and to this end, the plow is disposed relatively near one end of the device, as shown in Fig. 1.

In carrying out my invention, I provide, primarily, an evener 1, carrying near its ends suitable attachments, 2 and 16, whereby a series of draft animals may be attached to the device. I have shown no particular arrangement of draft animals, but it is my intention that separate sets of animals be assembled with each of the attachments 2 and 16, by means of any of the common and well known arrangements of trees, it being intended, that, when the device is in operation, the draft animals shall travel substantially abreast, and not in tandem arrangement.

Upon one end of the evener 1 is rigidly mounted a rearwardly projecting equalizer stay 3, preferably disposed beyond the connection 16, which is carried by that end of the evener.

The numeral 6 denotes a plow beam, carrying at its terminal a transversely disposed clevis 5. A draw-bar 4, disposed at an acute angle to the evener 1, has its terminals pivotally connected with the evener and with the clevis, the pivotal connection between the draw-bar 4 and the clevis 5 being in substantial alinement with the plow beam 6. That end of the clevis 5 which is adjacent the equalizer stay 3, carries a forwardly projecting arm 7, which is rigidly assembled with the clevis. I further provide a diagonally disposed brace 9, having one of its terminals rigidly attached to the rear terminal of the equalizer stay 3, its forward terminal being rigidly mounted upon the evener 1. The equalizing bar 8 has one of its terminals pivotally connected with the terminal of the arm 7, the other terminal of the said equalizing bar being pivoted upon the equalizer stay 3.

I will now describe, more in detail, the construction of the various elements hereinbefore mentioned.

Referring to Fig. 2, it will be seen that the draw-bar 4 consists of a pair of plates 10, one of said plates being disposed above the evener and the clevis, and the other being disposed below the same.

From Fig. 3, it will be seen that the equalizer stay 3, consists of a pair of flat plates 11, disposed in close relation to each other, the forward terminals of these plates being spaced apart, to form arms 12, arranged to receive the terminal of the evener 1. The brace 9 comprises a pair of flat plates 13, one of them being disposed above the evener 1 and the equalizer stay 3, the other being disposed below those members, the equalizer bar 8 passing between the plates 13. Upon either side of the portions 11 of the equalizer stay are located washers 14, upon which are mounted the flat plates 13 which constitute the brace 9. The equalizer bar 8 comprises a pair of flat plates 15, between which is included the portion 11 of the equalizer stay 3. The several pivotal connections which are hereinbefore described, may be effected by passing bolts or like elements through the several parts which are to be pivotally united.

It will be seen that the draw-bar 4, although pivoted at 18 and 19, is inflexible. The connection between the clevis 5 and the equalizer stay 3, however, is not a rigid one, since the members 7 and 8 are pivotally connected at their extremities.

When the evener 1 moves forward under the impulse of the draft animals, the plow-beam 6 will tend to move out of parallelism with the section line A—B, which, in the present discussion, may be taken to represent the direction of the line of draft, the handle end of the plow approaching the line A—B more closely than the clevis end of the plow.

It is to be understood that the evener 1 carrying the stay 3 extends over the plowed ground, the lateral inclination of the moldboard of the plow-share toward the plowed ground, tending to thrust the landside of the plow share in an opposite direction, and to swing the handle end of the plow away from the plowed ground. This tendency of the plow to swing will cause the arm 7 to exert a thrust upon the equalizing bar 8, in the direction of the stay 3. Owing to the lateral inclination of the draw-bar 4, the draft animals at 2 will have a mechanical advantage over the animals at 16, which will tend to swing the member 1 rearward at the end upon which the connection 16 is mounted, and this rearward movement of one end of the evener 1, will, through the stay 3, which is rigidly assembled with the evener, cause the bar 8 to exert a thrust away from the stay 3 and toward the plow, which said thrust will tend to off-set the thrust in the opposite direction, due to the tendency of the plow to swing, as hereinbefore described.

Since the mechanical advantage of the draft animals at 2 ends to overcome the side draft in the plow as hereinbefore pointed out, it is obvious that the device is primarily and peculiarly adapted for use in connection with a plow.

Having thus described my invention, what I claim as new and desire to protect by Letters Patent is:—

1. In a device of the class described, an evener; a clevis; a draw bar disposed at an acute angle to the evener and being pivoted terminally to the evener and the clevis; a rearwardly projecting equalizer stay rigidly mounted upon one end of the evener; a forwardly projecting arm rigidly mounted upon the clevis; and an equalizing bar pivoted terminally to the arm and to the equalizer stay.

2. In a device of the class described, an evener; a clevis; a draw bar disposed at an acute angle to the evener and being pivoted terminally to the evener and the clevis; a rearwardly projecting equalizer stay rigidly mounted upon one end of the evener; a forwardly projecting arm rigidly mounted upon the clevis; an equalizing bar pivoted terminally to the arm and to the equalizer stay; and a diagonally disposed brace having its terminals rigidly mounted upon the evener and the equalizer stay.

In testimony that I claim the foregoing as my own, I have hereto affixed my signature in the presence of two witnesses:

WALTER H. PICKLE.

Witnesses:
 JNO. I. MELVILLE,
 MYRTLE TAYLOR.

It is hereby certified that in Letters Patent No. 926,019, granted June 22, 1909, upon the application of Walter H. Pickle, of Sprague, Washington, for an improvement in "Equalizers," an error appears in the printed specification requiring correction, as follows: Page 2, line 52, the word "ends," should read *tends;* and that the said Letters Patent should be read with this correction therein that the same may conform to the record of the case in the Patent Office.

Signed and sealed this 19th day of October, A. D., 1909.

[SEAL.]

C. C. BILLINGS,

*Acting Commissioner of Patents.*